(12) United States Patent
Nicholson

(10) Patent No.: US 9,302,854 B2
(45) Date of Patent: Apr. 5, 2016

(54) OUTLET VALVE FOR A CABLE CONVEYOR

(71) Applicant: Intraco, Inc., Oskaloosa, IA (US)

(72) Inventor: Eric L. Nicholson, Oskaloosa, IA (US)

(73) Assignee: INTRACO, INC., Oskaloosa, IA (US)

( * ) Notice: Subject to any disclaimer, the term of this patent is extended or adjusted under 35 U.S.C. 154(b) by 138 days.

(21) Appl. No.: 14/199,475

(22) Filed: Mar. 6, 2014

(65) Prior Publication Data

US 2015/0251852 A1    Sep. 10, 2015

(51) Int. Cl.
  *B65G 19/08* (2006.01)
  *B65G 19/28* (2006.01)
  *B65G 19/14* (2006.01)
  *B65G 19/18* (2006.01)

(52) U.S. Cl.
  CPC .............. *B65G 19/28* (2013.01); *B65G 19/14* (2013.01); *B65G 19/18* (2013.01)

(58) Field of Classification Search
  CPC ..................................................... B65G 19/28
  USPC ........... 198/716, 717, 725, 728, 735.1, 735.3, 198/735.4
  See application file for complete search history.

(56) References Cited

U.S. PATENT DOCUMENTS

| | | | |
|---|---|---|---|
| 3,962,996 A | 6/1976 | Jones | |
| 4,031,857 A | 6/1977 | Jones | |
| 4,195,725 A | 4/1980 | Jones | |
| 4,197,938 A | 4/1980 | Klinkenberg | |
| 5,097,797 A | 3/1992 | Van Zee | |
| 5,205,416 A | 4/1993 | Van Zee | |
| 5,901,833 A * | 5/1999 | Yokoyama | B65G 19/02 198/725 |
| 6,267,227 B1 * | 7/2001 | McGoun | B65G 47/78 198/359 |

* cited by examiner

*Primary Examiner* — Gene Crawford
*Assistant Examiner* — Lester Rushin
(74) *Attorney, Agent, or Firm* — Sturm & Fix LLP

(57) ABSTRACT

A conveyor system with an endless loop tubular system has an inlet provided for permitting material to be introduced into the tubular system. An endless loop flexible member extends through the tubular system and has inserts disposed thereon for moving material along the endless loop tubular system. A drive mechanism is provided for causing the endless loop flexible member and inserts to move in at least one direction through the endless loop tubular system. A novel outlet valve disposed in the endless loop tubular system is provided for selectively permitting the material to fall out of the endless loop tubular system by gravity, the outlet valve having an opening with an insert entry end and a insert exit end, a first side and a second side and wherein the insert entry end is larger than the insert exit end.

16 Claims, 3 Drawing Sheets

OUTLET VALVE FOR A CABLE CONVEYOR

TECHNICAL FIELD

This invention relates generally to an improved outlet valve for a cable conveyor that reduces shearing of the material as it exits the cable conveyor.

BACKGROUND

Cable conveyor systems have been in use for decades. These cable conveyor systems use an endless loop tubular system extend to remote locations and then end up back where they started. This could be compared to or can be similar to a tube that is circular, for example like a hollow round hula hoop, but the tube itself usually takes a winding path (for example as shown in U.S. Pat. No. 4,197,938 to Klinkenberg) and the tubular system has structural differences at the corners where it makes turns. It also has other structural members attached to it, such as inlets, outlets (for example as shown in U.S. Pat. No. 4,031,857 to Jones), cable drive units (for example as shown in U.S. Pat. No. 4,195,725 to Jones), idler housings (FIG. 5), etc., all of which are well known in a general way in this art.

For the purposes of this document, "endless loop" is defined herein as a somewhat endless track or circuit. In the case of an endless loop tubular system it starts out at one point, extends to wherever else it is designed to go, and then ends up back at that one starting point again.

These aforementioned endless loop tubular systems also have an endless loop flexible member inside with the ends thereof attached to each other to form a "circuit" within the endless loop tubular system. These endless loop flexible members are typically cables, but "endless loop flexible members" can include chains, ropes, or the like. The endless loop flexible member has inserts or discs on them such as those shown on the cables of the aforementioned U.S. Patents, all of which are incorporated herein by reference in their entirety. The endless loop tubular systems can, for example, wind through a building to have outlets wherever the user may wish to deliver the product being conveyed, there being an unlimited possibility of shapes of the endless loop tubular system and virtually an unlimited number of outlet opening locations for selectively delivering the material being conveyed to wherever desired. Typically each outlet opening can be opened or closed individually as will be understood from the description below.

One of the few problems associated with such a cable conveyor system is that there can be some shearing of the material being conveyed when an object being conveyed is pinned between the exit end of the outlet opening and one of the discs or inserts pushing the object through the tubular system. This problem is illustrated in FIGS. 1 and 1A which show a cable 10 passing through a tube 11. A gear 12 is on one end of the tube 11 so the tube can be rotated about the axial center of the tube by rotating it. Discs/inserts 13 are attached to the cable 10, which are shown pushing pistachio nuts P to the left in FIGS. 1 and 1A. The pistachio nuts P being conveyed are being delivered to a chosen place below an outlet opening 14, and can be seen dropping out of an outlet opening 14. The entry side 14*en* of the outlet 14 is where the pistachio nuts P start dropping out of the outlet 14 and the end 14*ex* of the outlet 14 is where the pistachio nuts P stop dropping out of the opening 14.

The problem to be solved by the invention disclosed below is illustrated by the pistachio nut P1 that is being pinned between the disc 13 and the exit end 14*ex* of the opening 14. When this occurs, the pistachio nut P1 will be broken into pieces. These pieces of pistachio nut P1, for illustration purposes only, is shown to be shell portions P2 and P3 and meat portion P4, shown in dashed lines below the pistachio P1 in FIGS. 1 and 1A. Typically when this breaking up of a pistachio nut P occurs, it breaks the pistachio P1 into many more pieces than are shown in FIG. 1. When this occurs, of course, it degrades the quality of the pistachio nuts P being delivered out the outlet opening 14 that have been broken in the manner illustrated in FIG. 1.

Accordingly, there is a need for an outlet for a cable conveyor system that reduces shearing of the objects being conveyed.

SUMMARY OF THE INVENTION

The present invention relates to a conveyor system with an endless loop tubular system. An inlet is provided for permitting material to be introduced into the tubular system. An endless loop flexible member extends through the tubular system and has inserts disposed thereon for moving material along the endless loop tubular system. A drive mechanism is provided for causing the endless loop flexible member and inserts to move in at least one direction through the endless loop tubular system. An outlet valve disposed in the endless loop tubular system is provided for selectively permitting the material to fall out of the endless loop tubular system by gravity, the outlet valve having an opening with an insert entry end and an insert exit end, a first side and a second side. The insert entry end is larger than the insert exit end.

BRIEF DESCRIPTION OF THE DRAWINGS

The above needs are at least partially met through provision of the apparatus described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Figure 5:
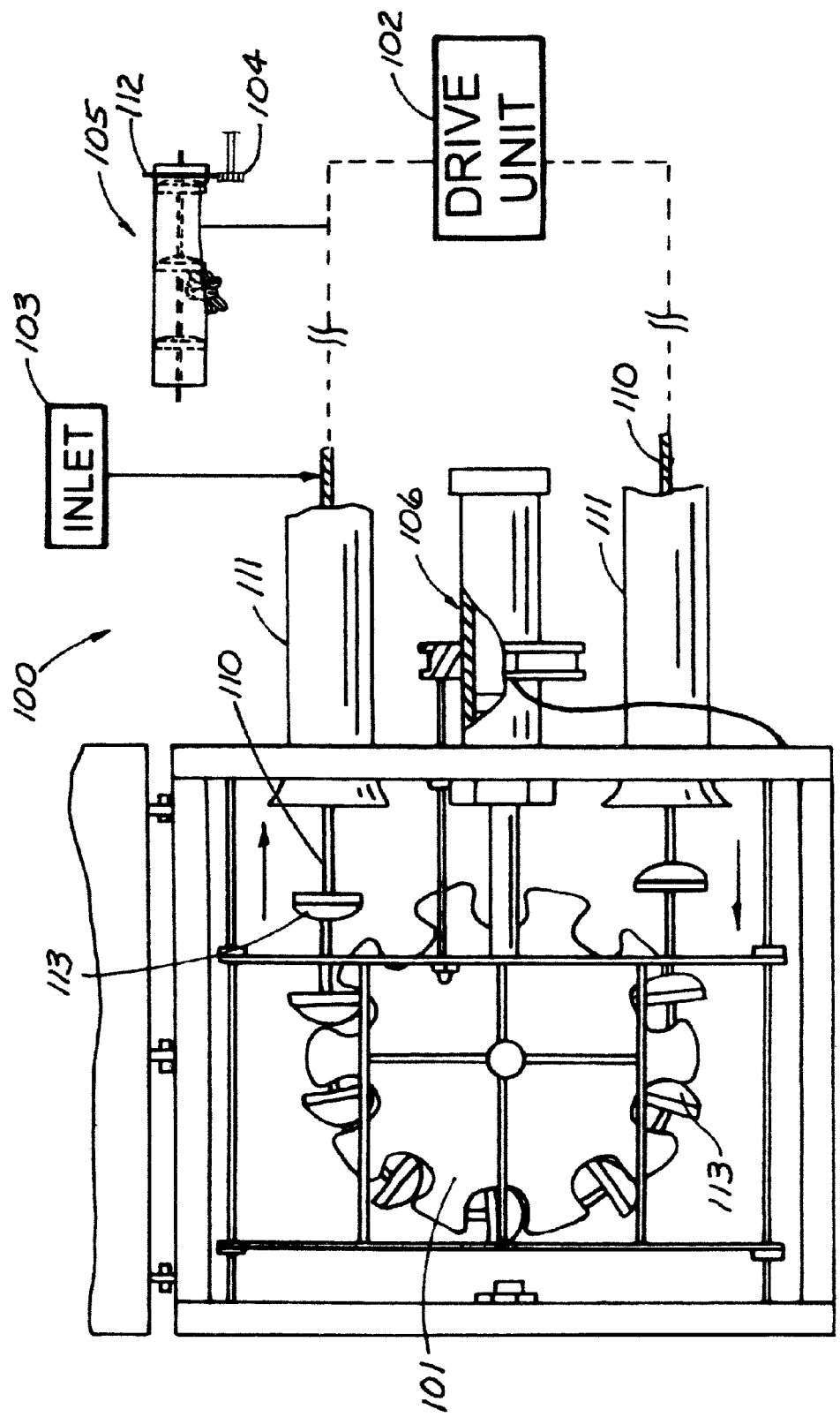
FIG. 5 is a view of the major parts of the conveyor system, shown partially schematically, with the cable and discs going around an idler pulley and through the tubular system and showing an inlet, outlet valve and drive unit to cause the cable with discs on it to move through the tubular system.

Referring now to the drawings, wherein like reference numerals indicate identical or similar parts throughout the several views, FIG. 5 shows an endless loop tubular system 100 with an endless loop cable 110 with discs 113 on it. Shown schematically is a drive unit 102 of the same general type, for example, as shown in U.S. Pat. No. 4,195,725 to Jones. Looking to FIGS. 3 and 5, an inlet 103 is where material to be conveyed, such as pistachio nuts P, are introduced into the system. A pneumatic tension adjusting system 106 is shown for keeping proper tension on the cable 110, but this pneumatic tensioning adjusting system 106 forms no part of the present invention. It is just shown to illustrate one part of one example of a cable conveyor system 100.

FIG. 5 also shows an outlet valve 105, one of which can be placed wherever the user wants to deliver the product being conveyed. The outlet valve 105 has a gear 112 on one end thereof which can be used in conjunction with gear 104 to rotate the outlet valve 105 about the central longitudinal axis of the tubular outlet valve 105 to open, close or meter the material being delivered out of the outlet opening 114 by rotating the cylindrical outlet valve 105 about its longitudinal axis.

Figure 1:
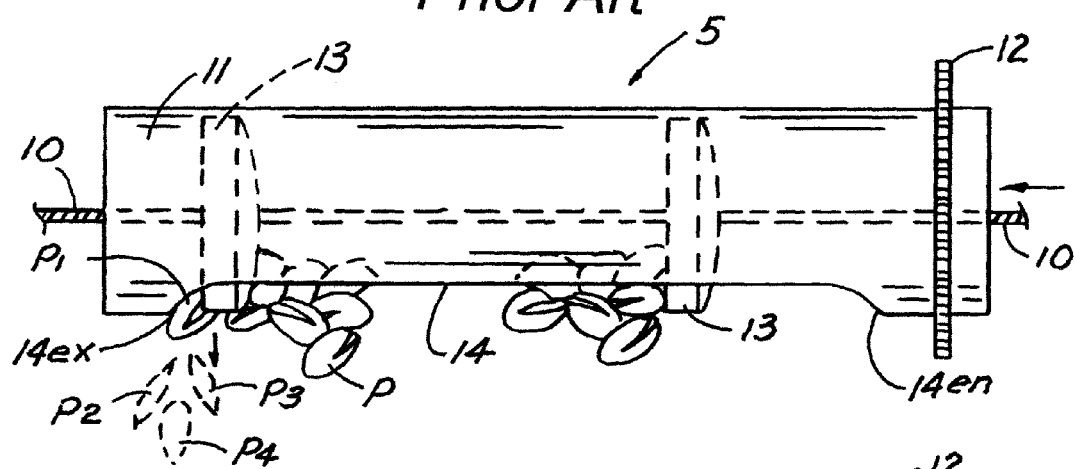
FIG. 1 is a top view of an outlet in a prior art cable conveyor system showing pistachio nuts being conveyed and dropping out of an opening in an outlet valve.
Figure 1A:
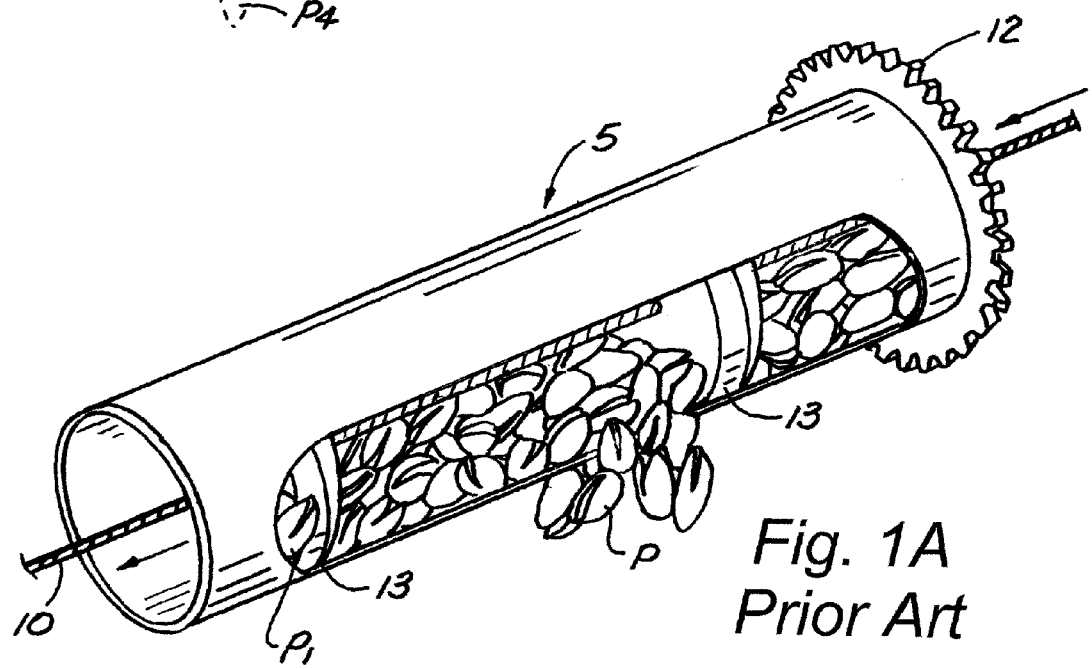
FIG. 1A is an isometric view of the structure of FIG. 1 turned to look from the outside of the outlet opening towards the inside of the cable conveyor system.
Figure 2:
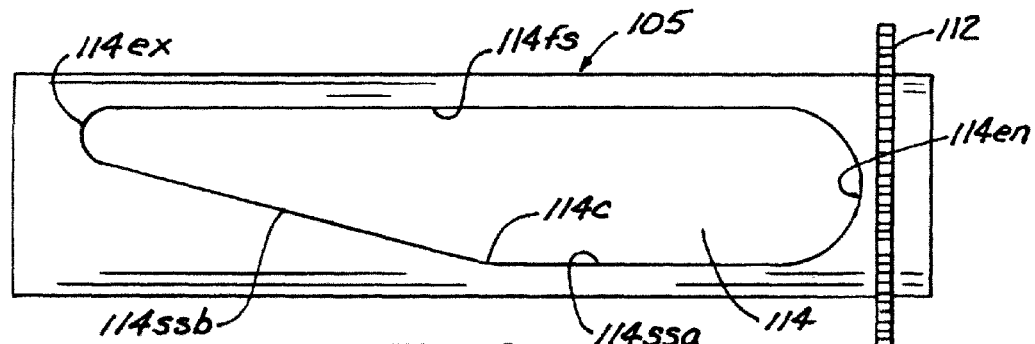
FIG. 2 is a side view of a preferred embodiment of the outlet opening of the present invention.

FIG. 2 shows the outlet valve 105 disposed in the endless loop tubular system 100 is provided for selectively permitting the material, such as pistachio nuts P, to fall out of the endless loop tubular system 100 by gravity, the outlet valve 105 having an opening 114 with an insert entry end 114*en* and an insert exit end 114*ex*, a first side 114*fs* and a second side 114*ssa*/114*ssb*. The insert entry end 114*en* is larger than the insert exit end 114*ex*.

Still looking at FIG. 2, a first side 114*fs* of the outlet opening 114 is straight and the second side 114*ssa*/114*ssb* of the outlet opening is not straight throughout its length. The entry end 114*en* of the outlet opening 114 is curved, the exit end 114*ex* of the outlet opening 114 is curved and the second side 114*ssa*/114*ssb* of the outlet opening 114 is closer to the first side 114*fs* of the outlet opening 114 at the insert exit end 114*ex* than at the insert entry end 114*en* thereof. The second side 114*ssa*/114*ssb* of the outlet opening 114 has a first straight portion 114*ssa* parallel to the first side 114*fs* of the outlet opening 114 and a second portion 114*ssb* that is not parallel to the first side 114*fs* of the outlet opening 114. It is to be understood, however, that this is only the preferred embodiment and that other configurations within the broad language of the attached claims are fully equivalent thereto. For example, the ends 114*en* and 114*ex* could be straight and fall in a plane perpendicular to the longitudinal center axis of the outlet valve 105. Also by example only, one or more or all of the straight walls 114*fs*, 114*ssa* and 114*sb* can be curved in the broadest claimed form of the present invention.

The second portion 114*ssb* of the second side 114*ssa*/114*ssb* is straight, in the preferred embodiment of the outlet valve 105 shown, and is closer to the first side 114*fs* adjacent the exit end 114*ex* of the outlet opening 114 than it is to the second side 114*ssb* of the outlet opening 114 at the point 114*c* where the second portion 114*ssb* connects to the first portion 114*ssa* of the second side 114*ssa*/114*ssb*.

Figure 3:
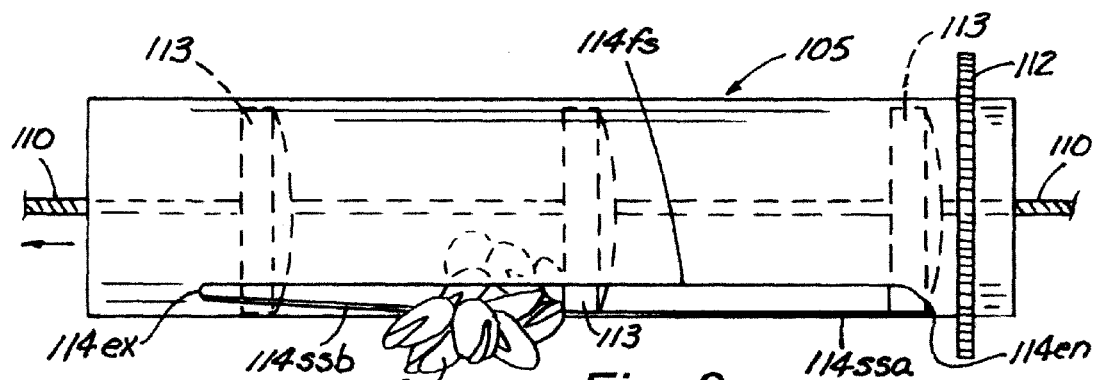
FIG. 3 is a top view of the outlet of FIG. 2 with a cable conveyor moving pistachio nuts from right to left and showing pistachio nuts dropping out of the outlet opening.
Figure 4:
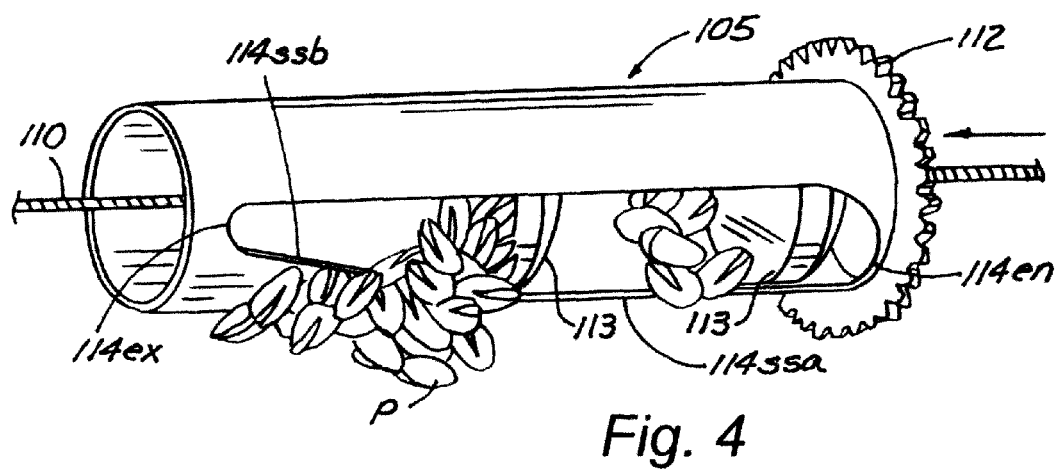
FIG. 4 is an isometric view of the outlet opening shown in FIG. 3 of the cable conveyor moving pistachio nuts from right to left and showing pistachio nuts dropping out of the outlet opening.

In operation, when the cable conveyor system 100 of FIG. 5 is conveying product and the outlet valve 105 is in the position shown in FIGS. 2 and 3, with product P will be moving from right to left. The shape of opening 114 prevents damage during the full opening cycle (when outlet valve 15 is being turned about its longitudinal axis) while product is flowing through the tube and the discharge is being opened. Once fully opened, all product P falls out prior to reaching this modified geometry of the discharge 114. Another benefit of this shape 114, and the key advantage of the present invention, is to allow the discharge of the product P, such as pistachio nuts P, to stop before the product P arrives at the end 114*ex*. An infinite number of points on surface 114*ssb* between fully open and fully closed allow an infinitely variable percent of discharged product P. Discharging anywhere between 0% of the product P up to 100% of the product P at any given discharge point along the surface 114*ssb* can be done without damage/shearing to the material P being conveyed. The key to this success is that the straight section 114*ssa* of the discharge opening 114 is always lower than the end 114*c* of the angled section 114*ssb*. The product P, as it is being discharged, contacts this "ramp" 114*ssb* and is either forced back into the safety of the tubing 105 or out into the discharge stream as shown by the product P shown in solid lines in FIG. 3. Additionally, the fact that the exit end 114*ex* is smaller than the entry end 114*en* of the opening 114, further reduces the chances that a pistachio nut P will fall into the space between the exit end 114*ex* and one of the discs 113.

If it is desired to close the outlet valve 105, the gear 104 can be used to turn the outlet 105 so that the opening 114 is up. That way the pistachio nuts P will not fall out of the opening 114 as they are pushed past the opening 114 by the discs 113 on the moving cable 110.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept as expressed by the attached claims.

I claim:

1. A conveyor system comprising:
   an endless loop tubular system, including sidewalls and lower wall;
   an inlet for permitting material to be conveyed to be introduced into the endless loop tubular system;
   an endless loop flexible member;
   inserts disposed on the endless loop flexible member for moving material along the endless loop tubular system;
   a moving chamber being disposed between adjacent inserts, the moving chamber being further defined by portions of the sidewalls and portions of a lower wall of the tube, a portion of the endless loop flexible member being disposed in the moving chamber between adjacent inserts, at least a portion of the material to be conveyed being disposed in the moving chamber below the portion of the endless loop flexible member;
   a drive mechanism for causing the endless loop flexible member and inserts to move in at least one direction through the endless loop tubular system; and
   an outlet opening disposed in the endless loop tubular system for selectively permitting the material to fall out of the endless loop tubular system by gravity, the outlet opening having an insert entry end and an insert exit end, a first side and a second side and wherein the insert entry end is larger than the insert exit end.

2. The conveyor system of claim 1 wherein the first side of the outlet opening is straight and the second side of the outlet opening is not straight throughout its length.

3. The conveyor system of claim 1 wherein the second side of the outlet opening is closer to the first side of the outlet opening at the insert exit end than at the insert entry end thereof.

4. The conveyor system of claim 1 wherein the entry end of the outlet opening is curved and the second side of the outlet opening is closer to the first side of the outlet opening at the insert exit end than at the insert entry end thereof.

5. The conveyor system of claim 1 wherein the entry end of the outlet opening is curved, the exit end of the outlet opening is curved and the second side of the outlet opening is closer to the first side of the outlet opening at the insert exit end than at the insert entry end thereof.

6. The conveyor system of claim 1 wherein the first side of the outlet opening is straight and the second side of the outlet opening is not straight throughout its length, the entry end of the outlet opening is curved, the exit end of the outlet opening is curved and the second side of the outlet opening is closer to the first side of the outlet opening at the insert exit end than at the insert entry end thereof.

7. The conveyor system of claim 1 wherein the first side of the outlet opening is straight and the second side of the outlet opening is not straight throughout its length, the entry end of the outlet opening is curved, the exit end of the outlet opening is curved and the second side of the outlet opening is closer to the first side of the outlet opening at the insert exit end than at the insert entry end thereof and wherein the second side of the outlet opening has a first straight portion parallel to the first side of the outlet opening and a second portion that is not parallel to the first side of the outlet opening.

8. The conveyor system of claim 7 wherein the second portion of the second side is straight and is closer to the first side adjacent the exit end of the outlet opening than at it is to the second side of the outlet where the second portion connects to the first portion of the second side.

9. An outlet valve for a cable conveyor system of a type having a moving chamber being disposed between adjacent inserts, the chamber being further defined by sidewalls and a lower wall of a tube, a portion of an endless loop flexible member being disposed in the moving chamber between adjacent inserts, a material to be conveyed being disposed in the moving chamber, at least a portion of the material to be conveyed being disposed in the moving chamber below the portion of the endless loop flexible member, the outlet valve comprising:
a housing operatively connected to the moving chamber, the housing having an outlet opening disposed therein for selectively permitting the material to fall out of the outlet opening by gravity, the outlet opening having an insert entry end and an insert exit end, a first side and a second side and wherein the insert entry end is larger than the insert exit end.

10. The conveyor system of claim 9 wherein the first side of the outlet opening is straight and the second side of the outlet opening is not straight throughout its length.

11. The conveyor system of claim 9 wherein the second side of the outlet opening is closer to the first side of the outlet opening at the insert exit end than at the insert entry end thereof.

12. The conveyor system of claim 9 wherein the entry end of the outlet opening is curved and the second side of the outlet opening is closer to the first side of the outlet opening at the insert exit end than at the insert entry end thereof.

13. The conveyor system of claim 9 wherein the entry end of the outlet opening is curved, the exit end of the outlet opening is curved and the second side of the outlet opening is closer to the first side of the outlet opening at the insert exit end than at the insert entry end thereof.

14. The conveyor system of claim 9 wherein the first side of the outlet opening is straight and the second side of the outlet opening is not straight throughout its length, the entry end of the outlet opening is curved, the exit end of the outlet opening is curved and the second side of the outlet opening is closer to the first side of the outlet opening at the insert exit end than at the insert entry end thereof.

15. The conveyor system of claim 9 wherein the first side of the outlet opening is straight and the second side of the outlet opening is not straight throughout its length, the entry end of the outlet opening is curved, the exit end of the outlet opening is curved and the second side of the outlet opening is closer to the first side of the outlet opening at the insert exit end than at the insert entry end thereof and wherein the second side of the outlet opening has a first straight portion parallel to the first side of the outlet opening and a second portion that is not parallel to the first side of the outlet opening.

16. The conveyor system of claim 15 wherein the second portion of the second side is straight and is closer to the first side adjacent the exit end of the outlet opening than it is to the second side of the outlet where the second portion connects to the first portion of the second side.

\* \* \* \* \*